3,650,958
ETCHANT FOR CUPREOUS METALS
Charles R. Shipley, Jr., Newton, Mass., assignor to
Shipley Company, Inc., Newton, Mass.
No Drawing. Filed July 24, 1970, Ser. No. 58,170
Int. Cl. C09k 3/00; C23f 1/00
U.S. Cl. 252—79.1                                           20 Claims

ABSTRACT OF THE DISCLOSURE

This invention is for a solution for etching cupreous metals comprising a source of cupric ions, at least one non-fuming complexing agent for cupric ions which is capable of forming a solution of soluble copper (II) complex at solution pH, and preferably a source of bromide or chloride ions. The invention is an improvement over prior art ammoniacal etchants inasmuch as it is capable of use over a wide range of pH and does not yield excessive ammonia fumes which would require expensive exhaust equipment and frequent replenishment of the etchant solution. In a preferred embodiment of this invention an etchant is provided which has a pH varying between 6 and 8 and more preferably, a pH of about 7 to 7.5.

BACKGROUND OF THE INVENTION

(1) Introduction

This invention relates to etching solutions and more particularly, to etching solutions for cupreous metals comprising cupric ions as a primary oxidant and a non-fuming complexing agent for said cupric ions.

(2) Description of the prior art

The stripping of copper coatings from substrates is a commonly encountered industrial operation. Typical copper stripping methods involve the use of acidic ferric chloride, cupric chloride, or chromic acid solutions. These methods, though effective, are often impractical in areas where waste disposal is regulated by law as such solutions are frequently required to be treated at considerable expense before the exhausted solutions can be discarded.

Ferric chloride solutions typically comprise from about 28° to 42° Baumé ferric chloride and free acid due to hydrolysis of the ferric chloride in aqueous solution which results in relatively low pH, typically below 2.0. Cupric chloride etching solutions typically are 1 to 3 molar in cupric chloride and contain HCl, NaCl or $NH_4Cl$ as an additive. As with ferric chloride solutions, pH is typically maintained below about 2.0.

Problems are encountered with most commercially available etchants. The above-described ferric chloride and cupric chloride etchants attack solder plate. All present disposal problems as they are highly corrosive and further, the metals in solution, particularly copper, will upset the role of bacteria required for sewage breakdown, as well as destroy plants and fish when dumped into natural waters. In addition, recovery of dissolved or precipitated metals is not economical even though the recovered metal values represent a potential asset.

Alkaline etchants useful above pH 8.5 and usually above pH 9.0 are also known. One such alkaline etchant for dissolving or stripping cuprous metal is disclosed in U.S. Pat. No. 3,231,503 and comprises a chlorite such as sodium chlorite as an oxidant in an alkaline solution containing an ammonium salt as a complexing agent for the metal stripped. The stripping solution is used at a pH of from 8 to 13 and preferably above pH 9. It is also disclosed in said patent that the useful life of the stripping solution can be extended upon exhaustion of the primary oxidant i.e., the chlorite by increasing the temperature to utilize dissolved copper in the cupric state as a secondary oxidant for further dissolution of copper converting the cupric copper to the cuprous form in the process. Consequently, at this stage of the etching operation, the etchant solution comprises an ammoniacal chloride solution of cupric ions as the sole oxidant having a pH between about 9 and 13. The chloride ions are provided by decomposition of the chlorite ions.

It has been found that the use of ammoniacal etchant solutions such as those described in the aforesaid Pat. No. 3,231,503 create problems as the high pH required causes excessive fuming of ammonia which fumes are a health hazard to an operator and create a requirement for expensive exhaust equipment. Moreover, because ammonia is evolved from the system, replenishment with ammonium hydroxide is required if the solution is to be used for an extended period of time.

STATEMENT OF THE INVENTION

The present invention provides a novel etchant that overcomes many of the difficulties noted above. The etchant of the invention is an essentially non-ammoniacal, non-fuming cupric etchant solution for cupreous metals which in a preferred embodiment, operates at the essentially neutral pH of about 7. The etchant comprises a source of cupric ions, at least one non-fuming complexing agent capable of forming a solution soluble copper (II) chelate and preferably a source of chloride or bromide ions.

A major advantage of the etchants of the present invention is the elimination of excessive ammonia fumes during the etching operation, thus resulting in the elimination of a need for expensive exhaust equipment. Another significant advantage of the invention is the virtual elimination of a need for constant replenishment of ammonium hydroxide to replace that which is lost from prior art ammoniacal solutions by fuming. A further advantage is that pH need not be maintained above 8.0 or below 2.0 to obtain effective etching as with prior art solutions, but may be selected within a relatively broad operating range, preferably between 4 and 13, dependent upon the selection of the complexing agent and its solubility characteristics at any given pH, and in this respect, it is a major advantage of the invention that the etchant may be operated at neutral pH which is defined herein as varying from about 6 to 8 and preferably between about 7.0 and 7.8.

There are certain disadvantages to the use of the etchant solutions of this invention. For example, the non-fuming complexing agents are more expensive than ammonia. However, the extra cost is compensated for by the virtual elimination of the need for replenishment and a capability for continuous re-use of the etchants of the invention as will be described in greater detail below. Also, some of the etchants of this invention have a somewhat slower etching rate than the ammoniacal etchants described above. However, it is also a discovery of this invention that ammonia added to the etchants of the invention in minor amount acts an an exaltant substantially increasing the etching rate to that attainable with the ammoniacal etchant solutions of the prior art and in some cases, in excess of the prior art solutions. It should be noted that in this embodiment, the ammonia is added in minor amount and consequently, fuming of ammonia does not occur to any substantial degree and exhaust equipment is not required. In the preferred embodiment, where pH is maintained below about 8.0, ammonia fumes are not detectable during the etching operation.

DESCRIPTION OF THE PREFERRED EMBODIMENTS

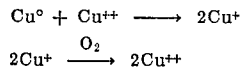

$$Cu^\circ + Cu^{++} \longrightarrow 2Cu^+$$
$$2Cu^+ \xrightarrow{O_2} 2Cu^{++}$$

As presented above, one mole of divalent copper oxidizes one mole of metallic copper to two moles of monovalent copper which latter is then oxidized to divalent copper by aeration such as by bubbling air through the solution, spray etching or the like. Sufficient divalent copper oxidant is maintained constant in solution to satisfactorily etch copper by the solubilizing effect of the complexing agent with excess copper precipitating in the form of an oxide or hydroxide. Thus, the etchant does not become saturated with copper residues. With removal of the copper precipitate periodically or continuously as it forms, the etchant can be used continuously provided certain precautions are taken as will be discussed in greater detail below. Chloride or bromide ion in solution is believed to act as a catalyst or exaltant for the etching reaction.

Substantially any cupric salt may be used as a source of the cupric ion. Typical cupric salts include, by way of example, cupric sulfate, cupric chloride, cupric nitrate, cupric acetate, and the like. The amount of cupric ion in the etchant solution is not critical, may vary within broad limits and to some extent is dependent upon the quantity of complexing agent used. A preferred range comprises from about 0.1 to 1.2 moles initially per liter of solution and most preferably, from 0.2 to 0.6 mole per liter. Higher concentrations tend to increase etching rate.

The complexing agent in accordance with the invention serves an important function. It is believed to solubilize sufficient cupric to permit etching. In this respect, it should be noted that within the operable pH range of from 4 to 13, insufficient cupric ion is held in solution to provide a satisfactory etching rate. Increasing the concentration beyond the normal solubility limit by the addition of a complexing agent permits addition of enough cupric ion to provide a satisfactory etch rate which is defined for purposes of this invention as at least 0.1 mil copper per minute with solution agitation.

The selection of the complexing agent is not critical provided certain guidelines are followed. For example, the complexing agent must be non-fuming, that is, it will not liberate appreciable ammonia fumes during the etching operation. Consequently, ammonium hydroxide is not within the scope of the invention for its complexing capability though ammonium ions may be added in minor amount as an exaltant as will be described in greater detail below. Another requirement of the complexing agent is that it be capable of forming a solution soluble copper (II) complex at some range within the desired pH range of from 4 to 13, within which range the etchant should be used. Further, the copper (II) complex should dissociate in the solution to an extent that permits etching of copper at at least the minimum rate of 0.1 mil per hour. In this respect, it should be readily apparent that the extent of dissociation of a complex is dependent upon numerous facts such as solution pH, solution temperature, concentrations of various additives and the like. Thus, though a particular copper (II) complex may not dissociate to a sufficient extent under one set of operating conditions, it may dissociate sufficiently under a different set of operating conditions to provide a satisfactory etching rate. As a guideline only, the log of the stability constant ($K_1$) for a particular copper (II) complex should not exceed 18 and preferably should not exceed 12 at 25° C. Stability constants for a great number of copper (II) complexes are set forth in Martell, Stability Constants of Metal-Ion Complexes, Special Publication No. 17, Section II, The Chemical Society, London, 1964, incorporated herein by reference.

Typical complexing agents for purposes of the present invention include hydroxy-carboxylic acids, especially aliphatic hydroxy-carboxylic acids such as hydroxyacetic acid (glycollic acid), malic acid, tartaric acid, gluconic acid, lactic acid, polyalcohols such as glycerol, surbitol, diethylene glycol, and mannitol; keto-acids such as pyruvic acid and levulinic acid; polyamines, especially aliphatic polyamines such as trimethylamine, propylenediamine, tetrahydroxypropylethylene diamine, and pentahydroxypropyldiethylene triamine; heteroaliphatic dicarboxylic acids such as diglycollic acid; amino acids, especially aliphatic amino-acids such as aminoacetic acid, alpha-aminopropionic acid, beta-aminopropionic acid, alpha-aminobutyric acid, iminodiacetic acid, iminotriacetic acid, and ethylenediaminotetraacetic acid; alkanolamines such as monoethanolamine diethanolamine, monoisopropanolamine, and disopropanolamine, and pyrophosphates such as sodium and potassium pyrophosphates. Of the above, certain of the alkanolamines are most preferred as they provide the fastest etching rates and in general, the alkylene amines are least preferred, as they provide the slowest etching rates. In this respect, it should be noted that the log of the stability constant for many alkylene amines is substantially higher than for typical alkanolamines, thus substantiating to some extent, the theory set forth above regarding dissociation of the copper (II) complex.

Though lesser amounts of complexing agents may be used in solution, the amount preferably used is that sufficient to complex all of the cupric ion initially in solution and more particularly, the complexing agent is present in an amount of at least 1.5 times the amount necessary to complex all of the cupric ion originally in solution and most preferably, at least five times the necessary amount to provide etching capacity. As should be apparent to those skilled in the art, the concentration of complexing agent used is dependent upon the type of ligand formed between the complexing agent and cupric ion—i.e., whether the ligand is monodentate, bidentate, tridentate or the like.

Ammonium ion is not required for the etchants of this invention to operate, though it is desirable to add an ammonium salt as its acts as an exaltant for the etching rate. Typical ammonium salts suitable for purposes of this invention include ammonium carbonate, ammonium sulphate, ammonium chloride and the like. The amount of ammonium salt is not critical and may vary broadly from no addition to less than that amount which causes appreciable fuming during the etching operation. The preferred range varies between 0.5 mole per liter of solution to 5 moles per liter and more preferably, from about 1 to 2 moles per liter of solution.

The chloride or bromide ion may be added to the etchant solution either in the form of cupric or ammonium chloride or bromide or in any other convenient form as wolud be obvious to the art such as sodium chloride or bromide. The function of the halide ion is not fully understood, but is believed to increase the etching rate, possibly by acting as a solubilizer for cuprous copper formed on the surface of a copper part being etched. The chloride or bromide ion may be present in minor amount, the actual concentration not being critical. Preferably, it is present in solution in an amount of at least 0.1 moles per liter of solution and more preferably, in an amount of from 0.2 to 2.0 moles per liter. It appears that there is a synergism between the ammonium and halide resulting in substantially increased etching rates.

As indicated above, the etchants of the invention may be used over a wide range of pH, preferably from about 4 to 13. However, in the most preferred embodiment of the invention, the etchants are used within the relatively neutral pH range of from about 6.0 to 8.0 and most preferably from about 7.0 to 7.8, because of the greater variety of available complexing agents, the lack of attack on substrate materials, photomasks, photoresists, ease of handling, safety and the like. It is believed that operating at a neutral pH is unique in itself as neutral etchants have not heretofore been available in the marketplace.

The operating temperatures for the etchant solution is not critical. Satisfactory results are obtained from below normal ambient room temperature to the boiling point of the etchant though it is generally desirable to maintain the temperature somewhat above room temperature, preferably between about 100 and 160° F. At higher temperatures, a faster etching rate is possible, thus increasing the number of available complexing agents useful for purposes of the invention.

A number of examples are given below for purposes of illustration wherein etching is conducted in a stagnant solution. Only a few of the possible modifications are specifically mentioned and it is not the purpose of these examples to limit the scope of the invention. Agitation of the solution will, of course, accelerate the rate of reaction indicated. In this respect, spray etching is much preferred to etching in a stagnant solution as the etch rate will be from 5 to 30 times faster. In all cases, aeration of some sort is necessary to convert cupreous to cupric.

gredients are not consumed or lost and divalent copper is continuously supplied by aerial or other oxidation or etched monovalent copper and maintained in substantially constant amount in solution by the complexing agent. To maintain constant operation, it is necessary to remove precipitated copper values either continuously or periodically during use to prevent saturation of the solution. This can be accomplished by circulating a portion of the etchant to filtering means, centrifugation means or by any manner known to those skilled in the art. In this respect, the copper values recovered are either in the form of an oxide or hydroxide which form has commercial value.

For continuous operation, it is desirable to incorporate nitrate ions into the etchant as disclosed in commonly assigned, copending U.S. patent application Ser. No. 58,160 filed concurrently herewith. It has been found that in etching copper metal with a cupric etchant, a film appears on the surface of the copper etched which is believed to be monovalent copper. This film protects the copper surface from further etching thereby resulting in a substantial decrease in the etching rate until ultimately, etching stops. The nitrate ion in the etching solution appears to destroy this film, possible by solubilizing the same or oxidizing the film to the soluble cupric form.

The etching solution herein described as well as the prior art ammoniacal etching solutions may also contain a source of molybdenum, tungsten or vanadium as described in commonly-assigned co-pending U.S. patent application Ser. No. 58,200 filed concurrently herewith. It has been found that the etching solutions of this inven-

| Example number | 1 | 2 | 3 | 4 | 5 | 6 | 7 | 8 | 9 | 10 | 11 | 12 |
|---|---|---|---|---|---|---|---|---|---|---|---|---|
| Ingredient (gm./l.): | | | | | | | | | | | | |
| Cupric chloride dihydrate | 50 | 50 | 50 | 50 | 50 | 50 | 50 | 50 | 50 | | 50 | 50 |
| Cupric sulphate pentahydrate | | | | | | | | | | 50 | | |
| Monoethanolamine | 200 | 200 | | | | | | | | | 200 | 200 |
| Diisopropanolamine | | | 200 | | | | | | | | | 200 |
| Tetrahydroxypropyl ethylene diamine | | | | 200 | | | | | | | | |
| Tartaric acid | | | | | 200 | 200 | | | | | | |
| Malic acid | | | | | | | 135 | | | | | |
| Trihydroxydiacetic acid | | | | | | | | 160 | | | | |
| Glycollic acid | | | | | | | | | 200 | | | |
| Sodium chloride | | | | | | | | 25 | 25 | | | |
| Ammonium chloride | | 50 | 50 | 50 | | 50 | 75 | 75 | 50 | | 60 | 100 |
| Ammonium nitrate | | 50 | 50 | 50 | | 50 | | | | 50 | 50 | |
| pH [1] | 7.5 | 7.6 | 7.5 | 7.4 | 7.5 | 6.6 | 7.5 | 7.5 | 7.5 | 7.5 | 7.6 | 7.4 |
| pH [2] | 7.5 | 7.2 | 7.5 | 7.1 | 7.3 | 6.6 | 7.2 | 7.2 | 7.1 | 7.3 | 7.2 | 7.0 |
| Etch rate [3] | .22 | .28 | .16 | .14 | .12 | .14 | 2.8 | .26 | .17 | .03 | .40 | .35 |
| Temperature, F | 125 | 125 | 125 | 125 | 125 | 125 | 125 | 125 | 125 | 125 | 175 | 175 |

[1] Initial pH of solution adjusted with either hydrochloric acid or sodium hydroxide to value indicated.
[2] pH measured after at least 20 minutes of use and standing at least 8 hours.
[3] Etch rate represents mils of copper etched per minute using a 2" x 2" copper foil in 1 liter of etchant.

In the above examples, no ammonia fumes were detectable during use of the etchant and only a slight ammonia odor was detected during the make-up of the etchant. The relatively slow etch rate of Example 10 is believed to be attributable to the absence of chloride ions.

A photoresist layer was applied over a copper clad laminate and immersed in the etchants of the above examples. No effect of the etchant on the photoresist was observed.

| Example number | 13 | 14 | 15 | 16 | 17 | 18 |
|---|---|---|---|---|---|---|
| Ingredient: | | | | | | |
| Cupric chloride dihydrate | 50 | 50 | 50 | 50 | 50 | 50 |
| Monoethanolamine | | | | 150 | 150 | 150 |
| Tartaric acid | 200 | 200 | 200 | 200 | 200 | 200 |
| Ammonium chloride | 50 | 50 | 50 | 50 | 50 | 50 |
| Ammonium nitrate | 50 | 50 | 50 | 50 | 50 | 50 |
| pH [1] | 5.0 | 6.5 | 7.5 | 9.2 | 11 | 13 |
| pH [2] | 5.2 | 6.6 | 7.3 | 7.8 | 8.2 | 9.3 |
| Etch rate [3] | 0.14 | 0.13 | 0.14 | 0.22 | 0.20 | 0.30 |
| Temperature, °F | 125 | 125 | 125 | 125 | 125 | 125 |

1, 2 and 3. See table above.

At the low pH—i.e., about 8.5 and below, ammonia fumes were not detectable. At higher pH, an ammonia odor was detectable but in no case was the odor strong enough to require venting equipment to protect an operator.

As earlier indicated, the etchants of this invention are capable of continuous use. Moreover, they do not require regeneration or substantial replenishment since active intion and the prior art ammoniacal etching solutions attack solder masks typically applied over copper surfaces such as in the making of the printed circuit boards. This attack somewhat restricts the use of these etching solutions. However, for reasons not understood, molybdenum, tungsten or vanadium substantially retards or eliminates the attack on the solder masks thereby avoiding this problem.

I claim:

1. An essentially neutral, aqueous etching solution for copper comprising a source of cupric ions as an oxidant for copper and at least one non-fuming complexing agent for said cupric ions, said complexing agent being capable of forming a solution soluble copper (II) complex at solution pH and said copper (II) complex being capable of sufficient dissociation in solution under operating conditions to permit etching of copper at a rate of at least 0.1 mil per minute.

2. The etching solution of claim 1 containing as exaltants at least one member selected from the group of chloride ions, bromide ions and ammonium ions.

3. The etching solution of claim 2 having a pH varying between about 6 and 8.

4. The etching solution of claim 2 having a pH varying between about 7.0 and 7.8.

5. The etching solution of claim 3 where the cupric ions are present initially in an amount of from about 0.1 to 1.2 moles per liter and the complexing agent is present in an amount sufficient to at least complex with all of said cupric ions.

6. The etching solution of claim 3 containing chloride or bromide ions in an amount of from 0.2 to 2.0 moles per liter of solution.

7. The etching solution of claim 3 containing ammonium ions in an amount of from 0.5 to 5.0 moles per liter of solution.

8. The etching solution of claim 3 containing chloride ions in an amount of from 0.2 to 2.0 moles per liter of solution and ammonium ions in an amount of from 0.5 to 5.0 moles per liter of solution.

9. The etching solution of claim 8 where the log of the stability constant ($K_1$) of the copper (II) complex does not exceed about 18 at 25° C.

10. The etching solution of claim 8 where the log of the stability constant ($K_1$) of the copper (II) complex does not exceed about 12 at 25° C.

11. The etching solution of claim 9 where the complexing agent is a member selected from the group of alkylene amines, alkanolamines, hydroxycarboxylic acids, amino carboxylic acids, polyalcohols, polyamines, heteroaliphatic dicarboxylic acids, amino acids, and pyrophosphates.

12. The etching solution of claim 11 wherein the complexing agent is an alkanolamine.

13. An aqueous etching solution for copper comprising a source of cupric ions as an oxidant for copper and at least one non-fuming complexing agent for said cupric ions, said complexing agent being capable of forming a solution soluble copper (II) complex at solution pH and said copper (II) complex being capable of sufficient dissociation in solution under operating conditions to permit etching of copper at a rate of at least 0.1 mil per minute, said aqueous etching solution having a pH of from about 4 to 13.

14. The etching solution of claim 13 containing as exaltant at least one member selected from the group of chloride ions, bromide ions and ammonium ions.

15. The etching solution of claim 14 where the cupric ions are present initially in an amount of from 0.1 to 1.2 moles per liter of solution and the complexing agent is present in an amount sufficient to at least complex with all of said cupric ions.

16. The etching solution of claim 14 also containing chloride ions in an amount of from 0.2 to 2.0 moles per liter of solution and ammonium ions in an amount of from 0.5 to 5.0 moles per liter of solution.

17. The etching solution of claim 16 where the log of the stability constant ($K_1$) of the copper (II) complex does not exceed about 18 at 25° C.

18. The etching solution of claim 16 where the log of the stability constant ($K_1$) of the copper (II) complex does not exceed about 12 at 25° C.

19. The etching solution of claim 18 where the complexing agent is a member selected from the group of alkylene amines, alkanolamines, hydroxycarboxylic acids, amino carboxylic acids, polyalcohols, polyamines, heteroaliphatic dicarboxylic acids, amino acids and pyrophosphates.

20. The etching solution of claim 19 where the complexing agent is an alkanolamine.

References Cited

UNITED STATES PATENTS

| | | | |
|---|---|---|---|
| 2,887,373 | 5/1959 | Winkler et al. | 156—18 X |
| 2,908,557 | 10/1959 | Black et al. | 252—79.2 X |
| 2,942,954 | 6/1960 | Thomas | 156—18 |
| 3,361,674 | 1/1968 | Miller et al. | 252—79.1 |
| 3,466,208 | 9/1969 | Slominski | 156—18 |
| 3,507,795 | 4/1970 | Gardner | 134—41 X |

WILLIAM A. POWELL, Primary Examiner

U.S. Cl. X.R.

156—18; 252—79.4